United States Patent [19]

Dodson et al.

[11] Patent Number: 4,620,892

[45] Date of Patent: Nov. 4, 1986

[54] PROCESS FOR THE ASSEMBLY OF WOODEN COMPONENTS AND ASSEMBLY OF WOODEN COMPONENTS

[75] Inventors: Michael G. Dodson, Magnolia; John R. Presley, Houston, both of Tex.

[73] Assignee: Interox America, Houston, Tex.

[21] Appl. No.: 646,444

[22] Filed: Aug. 31, 1984

[51] Int. Cl.$^4$ ............................................. C09J 5/04
[52] U.S. Cl. .................................. 156/319; 264/129; 428/326
[58] Field of Search ................................ 156/319

[56] References Cited

U.S. PATENT DOCUMENTS 2,443,197 6/1948 Rhodes .............................. 156/319
2,514,789 7/1950 Orth, Jr. ............................ 156/319

*Primary Examiner*—Jacob Ziegler
*Attorney, Agent, or Firm*—Spencer & Frank

[57] ABSTRACT

Process for the assembly of wooden components in which the wooden components are coated with a thermosetting resin containing formaldehyde and the resin-coated components are then treated with a peroxide and are then pressed together while heat is applied. Assembly of wooden components obtained by said process.

13 Claims, No Drawings

PROCESS FOR THE ASSEMBLY OF WOODEN COMPONENTS AND ASSEMBLY OF WOODEN COMPONENTS

The present invention relates to a process for the assembly of wooden components by gluing. It relates more particularly to a process according to which the wooden components are coated with a glue incorporating a thermosetting resin containing formaldehyde and the components are then pressed together while being heated to cure the glue.

The presence of free formaldehyde in articles made of assembled wooden components constitutes a source of major annoyance when these articles are intended to be used or placed inside buildings. Free formaldehyde in fact evaporates into the atmosphere and gives off persistent toxic odours which irritate the mucous membranes of the eyes, nose and throat.

It has been proposed to purify the wooden assembled articles by condensing the free formaldehyde by means of reactants such as resorcinol, urea or ammonia. However, none of these have been satisfactory in view of the reversibility of the reaction of condensation with formaldehyde. In addition, urea causes a reduction in the adhesive efficiency of the resin. Resorcinol has been found to be prohibitively expensive, and ammonia requires major investment for its utilisation and, in addition, subjects the operators to the hazards which are inherent in its handling.

In Czechoslovak Pat. No. 192,269 it is proposed to react the free formaldehyde present in aqueous resin solutions which are intended for gluing the wood with a solution of hydrogen peroxide with the aim of reducing the formaldehyde content in the ambient air in installations for the manufacture of compressed articles.

In Japanese Patent Application No. 49/25,108 a process is described which consists of adding an inorganic peroxide to the formaldehyde-based resin to suppress the odour of formaldehyde in plywood panels. In these known processes, the peroxide is reacted with the resin before the wooden components which are to be assembled are coating with it. They have the disadvantage of reducing the bonding of the assembled components compared to those products in which the resin has not been treated with peroxide.

The invention is aimed at overcoming this disadvantage by providing a process for assembling wooden components by means of a glue incorporating a thermosetting resin containing formaldehyde, in which the emission of formaldehyde vapour by the assembled components is significantly reduced or avoided, without harming the cohesion of the assembly.

The invention relates, for this purpose, to a process for the assembly of at least two wooden components in which the components are first coated with a glue incorporating a thermosetting resin containing formaldehyde, the glue is then treated with a peroxide and the components are then pressed together while heat is applied.

In the process according to the invention, the form of the wooden components and their number are not critical. They may, for example, be in the form of solid blocks, planks, sheets or particles such as chips, fibres or sawdust. The nature of the wood is not critical either, the latter being equally capable of being softwood or hardwood.

In the process according to the invention, the thermosetting resin containing formaldehyde may be any resin produced by the polycondensation technique, in which one of the monomeric components is formaldehyde, such as, for example, urea-formaldehyde, thiourea-formaldehyde, ethyleneurea-formaldehyde, melamine-formaldehyde, benzoguanamine-formaldehyde, acetoguanamine-formaldehyde, aniline-formaldehyde, phenol-formaldehyde and arenesulfonamide-formaldehyde resin (for example the p-toluenesulfonamide-formaldehyde resin) or mixtures of two or more of these resins.

The resin may advantageously be employed in the precondensed state as an aqueous solution.

In addition to the resin, the glue may, if appropriate, contain additives intended to strengthen the cohesion of the assembly or to endow it with particular properties. Additives which are in general use are hydrophobic agents such as paraffin waxes, fungidices and insecticides, particularly, pentachlorophenol, fire retardants (such as ammonium phosphates and sulphates, boric acid and borax) and acidic catalysts, preferably ammonium chloride, the role of which is to accelerate the condensation of the resin.

Suitable glues within the scope of the invention are those formed by an aqueous solution of resin containing from 30 to 80% by weight of solids, preferably 50 to 65%, used in a quantity such that after coating of the wooden components with the solution, the resin solids of the coating represent 1 to 10% by weight of solids of the wooden components employed, preferably 4 to 8% of this weight.

In addition, an emulsion of paraffin wax containing from 30 to 80% by weight of solids, preferably 50 to 65%, may be applied either separately or mixed with the resin solution, in such a quantity that the wax solids represent 0 to 1% by weight of solids of the wooden components employed, preferably 0.50 to 0.90% of this weight.

Any suitable technique may be employed to coat the wooden components with the glue and the wax. In the case where the wooden components are in a particulate state, the coating may be carried out in bladed or rotary mixers or by spraying. The optimum quantity of glue to be employed depends on various factors, particularly the nature of the resin, the composition of the glue, the form and size of the wooden components and the nature of the wood. It must be determined in each particular case.

According to the invention, after the wooden components have been coated with glue, the latter is treated with a peroxide. Peroxide is intended to denote any inorganic or organic peroxide capable of oxidising formaldehyde to formic acid. Examples of peroxides which may be employed within the scope of the invention are hydrogen peroxide, metal peroxides and more particularly the peroxides of alkali metals or alkaline-earth metals such as sodium peroxide, inorganic persalts such as perborates, percarbonates and persulphates, inorganic peracids such as persulphuric acid, organic peracids, more particularly those containing from 2 to 7 carbon atoms such as peracetic and perpropionic acids, as well as their salts and organic hydroperoxides and peroxides. Good results have been obtained with hydrogen peroxide. One or more peroxides of the same type or of different types may be employed.

The treatment with the peroxide may be carried out by any appropriate technique wich is capable of dispersing the peroxide in a substantially homogeneous manner on the glue coating the wooden components. Spraying is a technique wich may be advantageously employed; in the case of wooden particles, a mechanical blender may equally be employed.

The quantity of peroxide to be used should be sufficient to remove most and, preferably, all of the free formaldehyde from the glue coating the wooden components. It must be determined in each particular case. Good results are generally obtained with a quantity of hydrogen peroxide which is between 0.1 and 1% by weight of dry wood, preferably between 0.25 and 0.6% of this weight.

The compression of the wooden components is carried out with heating, and its function is to give the assembly the required shape and to cause the resin to set and harden. It may, for example, be carried out in a press with heated plates or rolls. The working temperature and pressure depend on the nature of the resin and, if appropriate, on the other components of the glue. Good results are usually obtained with a pressure of between 300 and 500 psi, a temperature of between 200° and 450° F. and a pressing time of between 100 and 500 s.

After the pressing, the assembly is cooled, for example in ambient air. It may then be subjected to a finishing treatment, such as, for example, trimming.

The process according to the invention applies to the manufacture of any kind of wooden assemblies by gluing, such as structural panels incorporating plywoods, wood veneers, particleboards and fibreboards, glued-laminated timbers, wood-plywood glued structural members, beams, and beams with plywood webs.

The process according to the invention applies in particular to the manufacture of wooden particleboards which are compressed by gluing by means of a urea-formaldehyde resin or a mixture of urea-formaldehyde resin with another resin containing formaldehyde. The wooden particles employed in this particular application of the process according to the invention may be wood fibres or any other wood chips, such as, for example:

cut flakes specially produced by passing logs through a disc-cut flaker, a cylindrical flaker, a knife-ring flaker or a centrifugal flaker and having a thickness ranging from 0.01 to 0.03 inch and an average length of approximately 1 inch;

planer shavings, frequently subjected to a mechanical process to reduce their size and to eliminate their tendency to curl;

splinters obtained without chopping by a process of hammering and smashing wood;

sawdust, preferably mixed with cut flakes.

In particular embodiment of the process according to the invention which employs components of moist wood, the latter are subjected to a preliminary drying before being coated with the glue. The drying is preferably controlled so that after coating with the glue and the peroxide treatment, the moisture content of the wooden components does not exceed 12% by weight, preferably 10%.

In another particular embodiment of the process according to the invention, which is applied to the assembly of wood particles, the particles are first classified into several individual classes as a function of their particulate sizes, each class of particles is treated separately with the glue and then hydrogen peroxide, a mat is then formed by superposition of the classes of particles and the mat is compressed while heat is applied. In this embodiment of the process according to the invention, the superposition of the particles in the mat may be arranged so that the latter incorporates a core of particles of coarse sizes, sandwiched between layers of particles of finer sizes.

The advantage of the invention will become apparent from reading the following comparative examples.

In each of the examples boards have been manufactured by compressing wooden particles. For this purpose, use has been made of particles having the following screen classification (according to ASTM mesh screen designation):

45% by weight greater than screen No. 18;
22% by weight passing through screen No. 18 but greater than screen No. 30;
22% by weight passing through screen No. 30 but greater than screen No. 60;
11% by weight passing through screen No. 60.

The particles have been mixed with a glue in order to be coated, a mat has then been produced and the glue-coated particles have been compressed in a press for 240 s under a pressure varying from 212 to 425 psi, at a temperature of 340° F.

FIRST SERIES OF EXAMPLES

EXAMPLE 1R (REFERENCE)

A drum blender was employed to blend wood chips onto which was sprayed a glue composed of ureaformaldehyde resin and paraffin wax the quantity of which was such that the resin content amounted to 6,5% of the weight of solids of the wood chips and the wax content to 0.65% of this weight. A mat was produced with the glue-coated chips using aluminum caul plates. The moisture content of the chip mat was 10%. The mat between the caul plates was placed in a hydraulic press in which it was pressed under the conditions described above.

EXAMPLE 2 (ACCORDING TO THE PRIOR ART)

The same procedure was employed for a second board in the case of which, in addition, according to the prior art, a solution of hydrogen peroxide of 5% strength by weight was mixed with the glue before the chips were coated with it. The quantity of hydrogen peroxide employed amounted to 0.286% of the weight of dry wood.

Measurements of the internal bond and of the concentration of formaldehyde emitted are given in table 1, in which IB denotes the internal bond of the assembly, measured according to the ASTM standard D1037, and HCHO Emission denotes the formaldehyde emission, measured according to the FTM-1 test (two-hour desiccator test) standardised jointly by the National Particleboard Association
   2306 Perkins Place
   Silver Spring, Maryland 20910 USA
Hardwood Plywood Manufacturers Association
   1825 Michael Faraday Drive
   Reston, Virginia 22090 USA
Formaldehyde Institute
   1075 Central Park Avenue
   Scarsdale, New York 10583 USA

TABLE 1

| Example No. | $H_2O_2$ Concentration (%) | IB (psi) | HCHO Emission (μg/ml) |
|---|---|---|---|
| 1R | 0 | 129 | 1.99 |
| 2 | 0.286 | 98 | 0.99 |

Comparison of the results obtained in examples 2 and 1R shows that the 50% reduction in the rate of emission of formaldehyde due to the addition of hydrogen peroxide has been obtained only at the cost of a significant reduction in the physical properties of the boards produced.

SECOND SERIES OF EXAMPLES

EXAMPLE 3R (REFERENCE)

Boards were produced using a technique similar to that of example 1R without the use of hydrogen peroxide, and the internal bond and formaldehyde emission, as defined above, were measured.

EXAMPLES 4, 5 AND 6 (ACCORDING TO THE INVENTION

All the conditions of the test of example 3R were repeated, but, in addition, after the wooden chips were coated, they were treated with sprayed hydrogen peroxide in a second blender. The quantity of hydrogen peroxide employed was controlled so that the moisture content of the chip mat amounted to 8% by weight for example 6 and near 10% for examples 4 and 5. At the end of the test, measurements were also carried out on the internal bond, as in example 3R. In addition, the rate of formaldehyde emission was measured according to the standard FTM-1.

The results of the test of examples 3R and 4 to 6 are shown in table 2.

TABLE 2

| Example No. | $H_2O_2$ Concentration (%) | IB (psi) | HCHO Emission (μg/ml) |
|---|---|---|---|
| 3R | 0 | 112 | 2.13 |
| 4 | 0.114 | 114 | 1.71 |
| 5 | 0.143 | 117 | 1.61 |
| 6 | 0.286 | 115 | 0.97 |

It can be seen that the application of peroxide in the manner according to the invention makes it possible to reduce the rate of emission of formaldehyde by more than 50% without affecting the physical properties of the boards.

We claim:

1. Process for the assembly of at least two wooden components comprising: first coating the components with a glue incorporating a thermosetting resin containing formaldehyde; then treating the glue with a peroxide; and, finally, pressing the components together while heat is applied.

2. Process according to claim 1, in which the peroxide is hydrogen peroxide.

3. Process according to claim 1, in which the peroxide is applied by spraying onto the wooden components coated with resin.

4. Process according to claim 1, in which the resin is used in the form of an aqueous solution.

5. Process according to claim 1, in which the thermosetting resin is a pre-condensed resin containing urea-formaldehyde.

6. Process according to claim 1, in which the glue contains paraffin waxes and a catalyst for the resin.

7. Process according to claim 6, in which the catalyst is ammonium chloride.

8. Process according to claim 1, in which the glue is formed by an aqueous solution of resin containing from 30 to 80% by weight of solids, used in a quantity such that after coating of the wooden components with the solution, the resin solids represent 1 to 10% by weight of dry solids of the wooden components employed.

9. Process according to claim 1, in which a paraffin wax emulsion containing 30 to 80% by weight of solids is applied in a quantity such that after the wooden components are coated with the wax, the wax solids represent 0.1 to 1.0% of the weight of dry solids of the wooden components.

10. Process according to claim 1, in which the quantity of peroxide employed is between 0.1 and 1% of the weight of solids of the wooden components.

11. Process according to claim 1, in which use is made of components made of moist wood which are subjected to drying before being coated with the glue.

12. Process according to claim 11, in which the drying is controlled so that after coating with the glue and the peroxide treatment the moisture content of the wooden components is at most 12% by weight.

13. Process according to claim 1 wherein said step of treating comprises applying to the glue an operative amount of a peroxide sufficient to at least substantially reduce the emission of formaldehyde vapor.

* * * * *